United States Patent
Tanaka et al.

(10) Patent No.: US 11,352,532 B2
(45) Date of Patent: Jun. 7, 2022

(54) REFRIGERATION APPARATUS

(71) Applicant: DAIKIN INDUSTRIES, LTD., Osaka (JP)

(72) Inventors: Masaru Tanaka, Osaka (JP);
Shigeharu Taira, Osaka (JP);
Tomoyuki Haikawa, Osaka (JP);
Yoshiki Shimizu, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 108 days.

(21) Appl. No.: 17/001,214

(22) Filed: Aug. 24, 2020

(65) Prior Publication Data

US 2020/0385618 A1 Dec. 10, 2020

Related U.S. Application Data

(63) Continuation of application No. 16/073,440, filed as application No. PCT/JP2017/002767 on Jan. 26, 2017, now Pat. No. 10,851,275.

(30) Foreign Application Priority Data

Jan. 29, 2016 (JP) .............................. JP2016-016428

(51) Int. Cl.
*C09K 5/04* (2006.01)
*F25B 13/00* (2006.01)
*F25B 45/00* (2006.01)

(52) U.S. Cl.
CPC ................ *C09K 5/041* (2013.01); *C09K 5/04* (2013.01); *F25B 13/00* (2013.01); *F25B 45/00* (2013.01);

(Continued)

(58) Field of Classification Search
None
See application file for complete search history.

(56) References Cited

U.S. PATENT DOCUMENTS 6,251,300 B1 * 6/2001 Takigawa ............. C10M 169/04
252/68
10,203,138 B2 * 2/2019 Appler ..................... C23F 11/12
(Continued)

FOREIGN PATENT DOCUMENTS

CN 101203588 A 8/2008
CN 102016445 A 4/2011
(Continued)

OTHER PUBLICATIONS

Extended European Search Report dated Jul. 26, 2019, for corresponding European Application No. 17744328.0.
(Continued)

*Primary Examiner* — Mark Kopec
*Assistant Examiner* — Jaison P Thomas
(74) *Attorney, Agent, or Firm* — Birch, Stewart, Kolasch & Birch, LLP

(57) ABSTRACT

A refrigeration apparatus includes a heat source unit, a utilization unit, and a liquid refrigerant pipe and gas refrigerant pipe. The utilization unit has utilization unit internal pipelines. The liquid refrigerant pipe and the gas refrigerant pipe connect the heat source unit and the utilization unit internal pipelines. A refrigerant circulates through the heat source unit, the utilization unit, the liquid refrigerant pipe, and the gas refrigerant pipe. The refrigerant contains a compound represented by a molecular formula having one or more carbon-carbon unsaturated bonds. A disproportionation inhibitor for reducing a disproportionation reaction of the refrigerant is applied to at least a part of inner surfaces (Continued)

of the liquid refrigerant pipe, the gas refrigerant pipe, and the utilization unit internal pipelines.

10 Claims, 2 Drawing Sheets

(52) U.S. Cl.
CPC .. *C09K 2205/102* (2013.01); *C09K 2205/132* (2013.01); *C09K 2205/134* (2013.01); *F25B 2313/006* (2013.01); *F25B 2313/0233* (2013.01); *F25B 2600/2513* (2013.01)

(56) References Cited

U.S. PATENT DOCUMENTS

| | | |
|---|---|---|
| 2002/0035848 A1 | 3/2002 | Komatsubara et al. |
| 2003/0057397 A1 | 3/2003 | Taira |
| 2003/0062508 A1 | 4/2003 | Singh et al. |
| 2005/0029488 A1* | 2/2005 | Li .................... C10M 111/02 252/68 |
| 2009/0082232 A1 | 3/2009 | Ikeda |
| 2009/0283712 A1 | 11/2009 | Zyhowski et al. |
| 2011/0041547 A1 | 2/2011 | Komatsu |
| 2011/0049414 A1 | 3/2011 | Kaneko et al. |
| 2011/0312101 A1 | 12/2011 | Tsuchiya et al. |
| 2014/0070132 A1 | 3/2014 | Fukushima |
| 2014/0260252 A1 | 9/2014 | Zyhowski et al. |
| 2015/0065407 A1 | 3/2015 | Matsumoto et al. |
| 2015/0300698 A1 | 10/2015 | Tanaka et al. |
| 2016/0281017 A1* | 9/2016 | Tsaih ................. C10M 171/008 |
| 2016/0347980 A1 | 12/2016 | Okamoto |
| 2017/0002244 A1 | 1/2017 | Fukushima et al. |
| 2017/0275514 A1 | 9/2017 | Kontomaris et al. |
| 2018/0209707 A1 | 7/2018 | Aoki et al. |
| 2018/0319726 A1 | 11/2018 | Mitsuoka et al. |
| 2019/0292476 A1* | 9/2019 | Nakajima ............ C10M 107/24 |
| 2020/0017795 A1* | 1/2020 | Saito .................... C10M 101/02 |
| 2020/0377776 A1* | 12/2020 | Matsumoto .......... C10M 107/34 |
| 2021/0009884 A1* | 1/2021 | Yamaguchi ........ C10M 171/008 |
| 2021/0230501 A1* | 7/2021 | Nara .................... C10M 171/02 |

FOREIGN PATENT DOCUMENTS

| | | |
|---|---|---|
| JP | 10-132398 A | 5/1998 |
| JP | 2001-181660 A | 7/2001 |
| JP | 2002-71231 A | 3/2002 |
| JP | 2007-315663 A | 12/2007 |
| JP | 2009-270727 A | 11/2009 |
| JP | 2011-57885 A | 3/2011 |
| JP | 2014-112026 A | 6/2014 |
| JP | 2015-7257 A | 1/2015 |
| KR | 10-2002-0010086 A | 2/2002 |
| KR | 10-2010-0120146 A | 11/2010 |
| KR | 10-2014-0032010 A | 3/2014 |
| KR | 10-2014-0142250 A | 12/2014 |
| WO | WO 2014/158663 A1 | 10/2014 |
| WO | WO 2014/161088 A1 | 10/2014 |
| WO | WO 2015/125885 A1 | 8/2015 |
| WO | WO 2015/136980 A1 | 9/2015 |
| WO | WO 2015/141679 A1 | 9/2015 |

OTHER PUBLICATIONS

International Preliminary Report on Patentability and the Written Opinion of the International Searching Authority (Forms PCT/IB/338, PCT/IB/373 and PCT/ISA/237), dated Aug. 9, 2018, for International Application No. PCT/JP2017/002767.
International Search Report (PCT/ISA/210) issued in PCT/JP2017/002767, dated Apr. 18, 2017.
Written Opinion (PCT/ISA/237) issued in PCT/JP2017/002767, dated Apr. 18, 2017.
Extended European Search Report for European Application No. 21151097.9, dated Apr. 19, 2021.

* cited by examiner ical Field

REFRIGERATION APPARATUS

CROSS-REFERENCE TO RELATED APPLICATIONS

This application is a Continuation of copending application Ser. No. 16/073,440, filed on Jul. 27, 2018, which is the National Phase under 35 U.S.C. § 371 of International Application No. PCT/JP2017/002767, filed on Jan. 26, 2017, and under 35 U.S.C. § 119(a) to Patent Application No. 2016-016428, filed in Japan on Jan. 29, 2016, all of which are hereby expressly incorporated by reference into the present application.

TECHNICAL FIELD

The present invention relates to a refrigeration apparatus.

BACKGROUND ART

In recent years, from the viewpoint of reducing global warming, some refrigeration apparatuses have used hydrofluoroolefin (HFO) as a refrigerant, which is disclosed in Patent Document 1 (Japanese Unexamined Patent Application Publication No. 2015-007257). HFO is easily decomposed by OH radicals in the atmosphere, and thus has a low global warming potential. Examples of HFO include 1,1,2-trifluoroethylene (HFO-1123) and 2,3,3,3-tetrafluoropropene (HFO-1234yf).

SUMMARY OF THE INVENTION

Technical Problem

Some refrigerants used in refrigeration apparatuses tend to undergo a self-decomposition reaction, called a disproportionation reaction, under certain conditions, because of their low thermal stability. The disproportionation reaction is a chemical reaction where two or more molecules of the same kind are transformed into two or more different substances due to factors, such as a mutual reaction between these molecules.

An example of the disproportionation reaction is polymerization of HFO-1123 refrigerant. HFO-1123 is a compound represented by a molecular formula that has one or more carbon-carbon unsaturated bonds. Because of this, a polymerization reaction is more likely to progress at high temperature and high pressure. The polymerization reaction is a reaction in which plural monomers are polymerized to form a compound (polymer compound) having a large molecular weight. A polymer, which is a compound produced by the polymerization reaction, usually has a molecular weight of 10,000 or more.

Likewise, HFO-1234yf also has a double bond in its composition, and hence is likely to undergo polymerization depending on the conditions, such as high temperature.

If part of the refrigerant is metamorphosed by the disproportionation reaction, the effective amount of the refrigerant circulating in a refrigerant circuit is decreased, causing the degradation in the performance of the refrigerant circuit. In addition, in some cases, products formed by the disproportionation reaction may clog a pipeline in the refrigerant circuit to inhibit the circulation of the refrigerant.

Therefore, it is an object of the present invention to reduce the occurrence of a disproportionation reaction of a refrigerant used in a refrigeration apparatus.

Solution to Problem

A refrigeration apparatus according to a first aspect of the present invention includes: a heat source unit; a utilization unit; a liquid refrigerant pipe and a gas refrigerant pipe; and a refrigerant. The utilization unit has a utilization unit internal pipeline. The liquid refrigerant pipe and gas refrigerant pipe connect the heat source unit and the utilization unit internal pipeline. The refrigerant circulates through the heat source unit, the utilization unit, the liquid refrigerant pipe, and the gas refrigerant pipe. The refrigerant contains a compound represented by a molecular formula having one or more carbon-carbon unsaturated bonds. A disproportionation inhibitor for reducing a disproportionation reaction of the refrigerant is applied to inner surfaces of at least a part of the liquid refrigerant pipe, the gas refrigerant pipe, and the utilization unit internal pipeline.

With this configuration, the disproportionation inhibitor is applied to at least a part of inner surfaces of the liquid refrigerant pipe, the gas refrigerant pipe, and the utilization unit internal pipeline. Therefore, the refrigerant circulating in the refrigerant circuit comes into contact with the disproportionation inhibitor, so that the disproportionation reaction is less likely to occur in the refrigerant.

A refrigeration apparatus according to a second aspect of the present invention is the refrigeration apparatus according to the first aspect, wherein the disproportionation inhibitor is a polymerization inhibitor for reducing polymerization of the refrigerant.

With this configuration, the disproportionation inhibitor reduces the polymerization of the refrigerant. Thus, the degradation in the performance of the refrigerant circuit due to products of polymerization can be reduced.

A refrigeration apparatus according to a third aspect of the present invention is the refrigeration apparatus according to the first aspect or second aspect, wherein the disproportionation inhibitor contains at least one of a stabilizer, an antioxidant, or a deoxidant.

With this configuration, the specific composition of the disproportionation inhibitor is specified.

A refrigeration apparatus according to a fourth aspect of the present invention is the refrigeration apparatus according to the third aspect, wherein the disproportionation inhibitor contains the stabilizer. The stabilizer contains at least one of an oxidation resistance enhancer, a heat resistance improver, or a metal deactivator. The oxidation resistance enhancer and the heat resistance improver contains at least one of N,N'-diphenyl-phenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, di-1-naphthylamine, di-2-naphthylamine, N-alkyl phenothiazine, 6-(t-butyl)phenol, 2,6-di-(t-butyl)phenol, 4-methyl-2,6-di-(t-butyl)phenol, and 4,4'-methylenebis(2,6-di-t-butylphenol). The metal deactivator contains at least one of imidazole, benzimidazole, 2-mercaptobenzthiazole, 2,5-dimercaptothiadiazole, salicylidene-propylene diamine, pyrazole, benzotriazole, tolutriazole, 2-methylbenzimidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, and an amine salt of an alkyl acid phosphate or a derivative thereof.

With this configuration, the specific composition of the stabilizer as a component of the disproportionation inhibitor is proposed.

A refrigeration apparatus according to a fifth aspect of the present invention is the refrigeration apparatus according to the third or fourth aspect, wherein the disproportionation inhibitor contains the antioxidant. The antioxidant contains at least one of zinc dithiophosphate, an organosulfur compound, 2,6-di-tert-butyl-4-methylphenol, 2,6-di-tert-butyl-4-ethylphenol, 2,2'-methylenebis(4-methyl-6-tert-butylphenol), phenyl-α-naphthylamine, N,N'-di-phenyl-p-phenylenediamine, and N,N'-disalicilidene-1,2-diaminopropane.

With this configuration, the specific composition of the antioxidant as a component of the disproportionation inhibitor is proposed.

A refrigeration apparatus according to a sixth aspect of the present invention is the refrigeration apparatus according to any one of the third to fifth aspects, wherein the disproportionation inhibitor contains the deoxidant.

The deoxidant contains at least one of 2-ethylhexyl glycidyl ether, glycidyl phenyl ether, epoxidized cyclohexyl carbinol, di(alkylphenyl)carbodiimide, and β-pinene.

With this configuration, the specific composition of the deoxidant as a component of the disproportionation inhibitor is proposed.

Advantageous Effects of Invention

The refrigeration apparatus according to the first aspect of the present invention is less likely to cause a disproportionation reaction in the refrigerant.

The refrigeration apparatus according to the second aspect of the present invention can reduce the degradation in the performance of a refrigeration circuit due to products of polymerization.

The refrigeration apparatus according to any one of the third to sixth aspects of the present invention specifies the specific compositions of the disproportionation inhibitor.

DESCRIPTION OF EMBODIMENTS

Hereinafter, embodiments of a refrigeration apparatus according to the present invention will be described with reference to the accompanying drawings. It should be noted that the specific configuration of the refrigeration apparatus according to the present invention is not limited to the embodiments below, and various modifications or changes can be made to these embodiments without departing from the scope of the present invention.

(1) Overall Configuration

Figure 1:
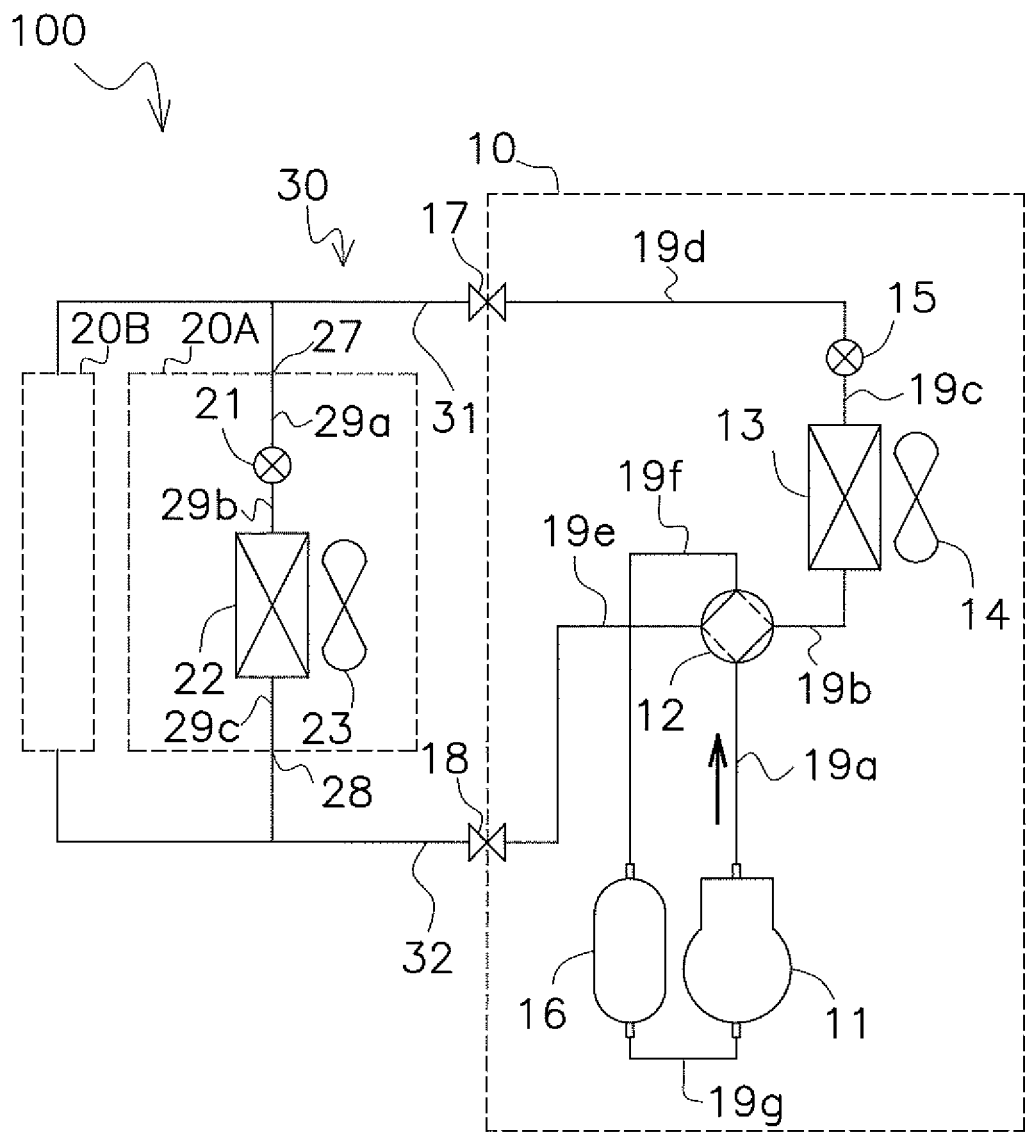
FIG. 1 is a schematic diagram showing a refrigerant circuit in a refrigeration apparatus 100 according to an embodiment of the present invention.

FIG. 1 shows a refrigeration apparatus 100 according to an embodiment of the present invention. The refrigeration apparatus 100 is, for example, an air conditioner. The refrigeration apparatus 100 includes a heat source unit 10, utilization units 20A and 20B, a refrigerant communication piping 30, and a refrigerant.

(2) Detailed Configuration (2-1) Heat Source Unit 10

The heat source unit 10 is for generating hot heat or cold heat. The heat source unit 10 includes a compressor 11, a four-way switching valve 12, a heat source unit heat exchanger 13, a heat source unit fan 14, a heat source unit expansion valve 15, a heat source unit liquid passage port 17, a heat source unit gas passage port 18, and heat source unit internal pipelines 19a to 19g.

(2-1-1) Compressor 11

The compressor 11 draws in and compresses a low-pressure gas refrigerant to generate a high-pressure gas refrigerant and then discharges the high-pressure gas refrigerant therefrom in the direction indicated by the arrow.

(2-1-2) Four-Way Switching Valve 12

The four-way switching valve 12 switches between a cold-heat usage operation and a hot-heat usage operation. The four-way switching valve 12 configures a refrigerant path indicated by the solid line during the cold-heat usage operation, and configures a refrigerant path indicated by the dashed line during the hot-heat usage operation.

(2-1-3) Heat Source Unit Heat Exchanger 13

The heat source unit heat exchanger 13 exchanges heat between the refrigerant and air around the heat source unit 10. In the case of the cold-heat usage operation, the heat source unit heat exchanger 13 functions as a condenser and releases the heat from the refrigerant into the air. On the other hand, in the case of the hot-heat usage operation, the heat source unit heat exchanger 13 functions as an evaporator, and takes heat from the air into the refrigerant.

(2-1-4) Heat Source Unit Fan 14

The heat source unit fan 14 promotes heat exchange by the heat source unit heat exchanger 13.

(2-1-5) Heat Source Unit Expansion Valve 15

The heat source unit expansion valve 15 is a valve capable of adjusting its opening degree, and functions as a decompression device for the refrigerant.

(2-1-6) Accumulator 16

The accumulator 16 is used to cause the gas refrigerant to pass therethrough while accumulating therein the liquid refrigerant that has not evaporated at a preceding stage of the compressor 11.

(2-1-7) Heat Source Unit Liquid Passage Port 17

The heat source unit liquid passage port 17 is for connecting a liquid refrigerant pipe 31. The heat source unit liquid passage port 17 incorporates therein a valve for manually closing, when the refrigeration apparatus 100 is not scheduled to be used for a long time, a path through which the liquid refrigerant mainly flows.

(2-1-8) Heat Source Unit Gas Passage Port 18

The heat source unit liquid passage port 17 is for connecting a gas refrigerant pipe 32. The heat source unit liquid passage port 17 incorporates therein a valve for manually closing, when the refrigeration apparatus 100 is not scheduled to be used for a long time, a path through which the gas refrigerant mainly flows.

(2-1-9) Heat Source Unit Internal Pipelines 19a to 19g

The heat source unit internal pipelines 19a to 19g are pipelines that connect a plurality of constituent elements of the heat source unit 10, that is, the compressor 11, the four-way switching valve 12, the heat source unit heat exchanger 13, the heat source unit expansion valve 15, the heat source unit liquid passage port 17, and the heat source unit gas passage port 18, and contribute to transfer of the refrigerant therebetween.

(2-2) Utilization Units 20A and 20B

The utilization units 20A and 20B are to utilize the hot heat or cold heat generated by the heat source unit 10 for convenience of users. The utilization unit 20A includes a utilization unit expansion valve 21, a utilization unit heat exchanger 22, a utilization unit fan 23, a utilization unit liquid passage port 27, a utilization unit gas passage port 28, and utilization unit internal pipelines 29a to 29c. The configuration of the utilization unit 20B is also the same as the configuration of the utilization unit 20A.

Hereinafter, the detailed configuration of the utilization unit 20A will be described, and a description of the configuration of the utilization unit 20B will be omitted.

(2-2-1) Utilization Unit Expansion Valve 21

The utilization unit expansion valve 21 is a valve capable of adjusting its opening degree, and functions as a decompression device or flow rate adjustment device for the gas refrigerant.

(2-2-2) Utilization Unit Heat Exchanger 22

The utilization unit heat exchanger 22 exchanges heat between the refrigerant and the air around the utilization unit 20A. In the case of the cold-heat usage operation, the utilization unit heat exchanger 22 functions as an evaporator and takes heat from the air into the refrigerant. On the other hand, in the case of the hot-heat usage operation, the utilization unit heat exchanger 22 functions as a condenser and releases the heat from the refrigerant into the air.

(2-2-3) Utilization Unit Fan 23

The utilization unit fan 23 promotes heat exchange by the utilization unit heat exchanger 22.

(2-2-4) Utilization Unit Liquid Passage Port 27

The utilization unit liquid passage port 27 is a portion for connecting a liquid refrigerant pipe 31.

(2-2-5) Utilization Unit Gas Passage Port 28

The utilization unit gas passage port 28 is a portion for connecting a gas refrigerant pipe 32.

(2-2-6) Utilization Unit Internal Pipelines 29a to 29c

The utilization unit internal pipelines 29a to 29c are pipelines that connect a plurality of constituent elements of the utilization unit 20A, that is, the utilization unit expansion valve 21, the utilization unit heat exchanger 22, the utilization unit liquid passage port 27, and the utilization unit gas passage port 28, and contribute to transfer of the refrigerant therebetween.

(2-3) Refrigerant Communication Piping 30

The refrigerant communication piping 30 connects the heat source unit 10 and the utilization unit 20A to form a refrigerant circuit. The refrigerant communication piping 30 has a liquid refrigerant pipe 31 and a gas refrigerant pipe 32. The liquid refrigerant pipe 31 connects the heat source unit liquid passage port 17 and the utilization unit liquid passage port 27. The gas refrigerant pipe 32 connects the heat source unit gas passage port 18 and the utilization unit gas passage port 28.

(2-4) Refrigerant

The refrigerant circulates through the heat source unit 10, the utilization units 20A and 20B, and the refrigerant communication piping 30. The refrigerant contains a compound represented by a molecular formula that has one or more carbon-carbon unsaturated bonds. The refrigerant is, for example, HFO.

(2-5) Disproportionation Inhibitor 40

Figure 2:
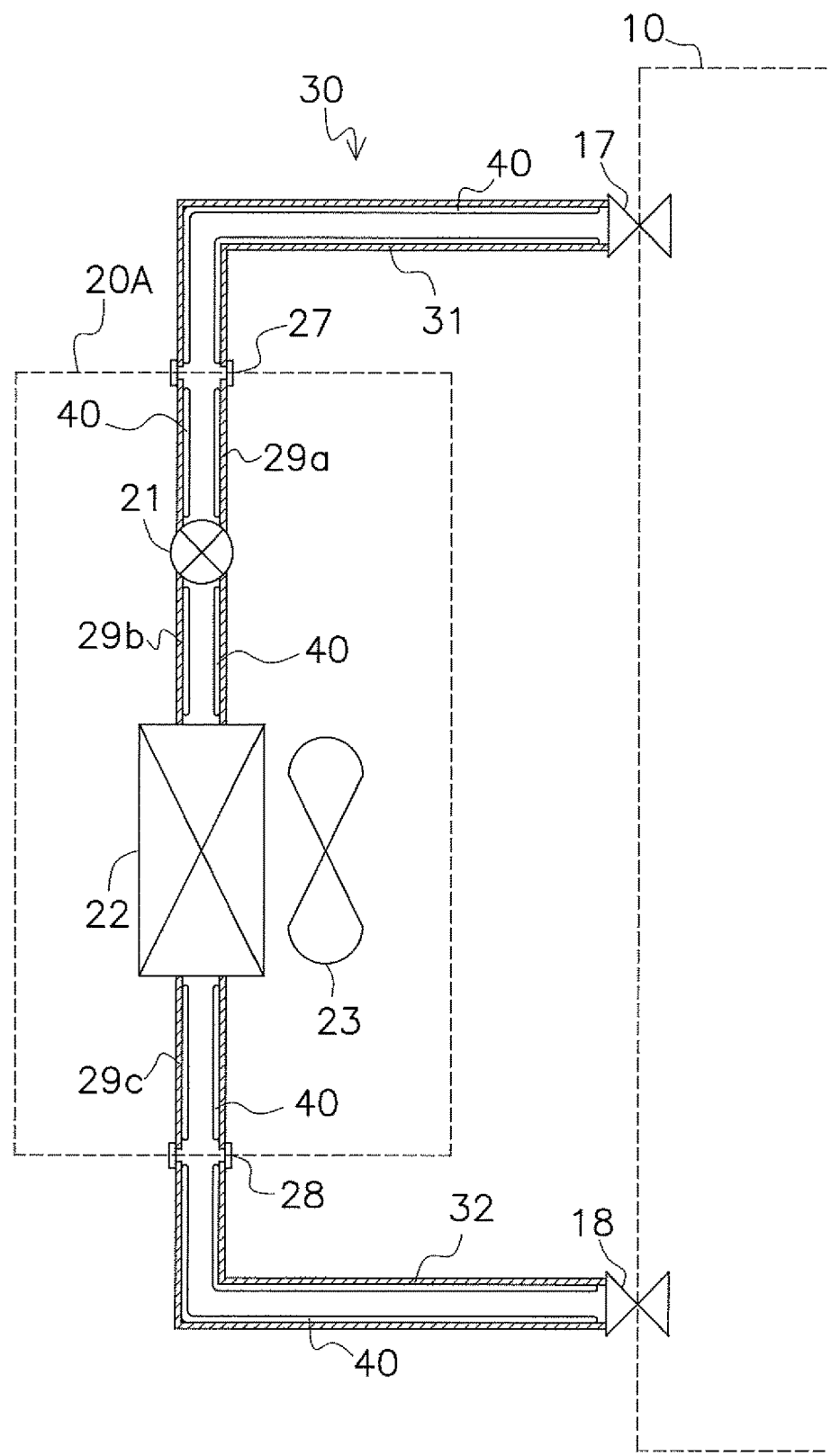
FIG. 2 is a schematic diagram showing a utilization unit 20A and a refrigerant communication piping 30 of the refrigeration apparatus 100 shown in FIG. 1.

FIG. 2 shows the utilization unit 20A and the refrigerant communication piping 30 of the refrigeration apparatus 100. A disproportionation inhibitor 40 is applied to inner surfaces of at least a part of the liquid refrigerant pipe 31, the gas refrigerant pipe 32, and the utilization unit internal pipelines 29a to 29c. The disproportionation inhibitor 40 is a substance for reducing the occurrence or progress of the disproportionation reaction. Preferably, the disproportionation inhibitor 40 is a polymerization inhibitor that reduces polymerization of the refrigerant.

The disproportionation inhibitor 40 contains at least one of a stabilizer, an antioxidant, or a deoxidant.

(2-5-1) Stabilizer

The stabilizer contains at least one of an oxidation resistance enhancer, a heat resistance improver, or a metal deactivator.

The oxidation resistance enhancer and the heat resistance improver contain at least one of the substances listed below.

<Oxidation Resistance Enhancer, Heat Resistance Improver>

N,N'-diphenyl-phenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, di-1-naphthylamine, di-2-naphthylamine, N-alkyl phenothiazines, 6-(t-butyl)phenol, 2,6-di-(t-butyl)phenol, 4-methyl-2,6-di-(t-butyl)phenol, and 4,4'-methylenebis(2,6-di-t-butylphenol).

The metal deactivator contains at least one of the substances listed below.

<Metal Deactivator>

Imidazole, benzimidazole, 2-mercaptobenzthiazole, 2,5-dimercaptothiadiazole, salicylidene-propylenediamine, pyrazole, benzotriazole, tolutriazole, 2-methylbenzimidazole, 3,5-dimethylpyrazole, methylenebis-benzotriazole, organic acids or their esters, primary, secondary or tertiary aliphatic amines, amine salts of an organic acid or inorganic acid, nitrogen-containing heterocyclic compounds, and amine salts of alkyl acid phosphates or their derivatives.

(2-5-2) Antioxidant

The antioxidant contains at least one of the substances listed below.

<Antioxidant>

Zinc dithiophosphates, organosulfur compounds, 2,6-di-tert-butyl-4-methylphenol, 2,6-di-tert-butyl-4-ethylphenol, 2,2'-methylenebis(4-methyl-6-tert-butylphenol), phenyl-α-naphthylamine, N,N'-di-phenyl-p-phenylenediamine, and N,N-disalicilidene-1,2-diaminopropane.

(2-5-3) Deoxidant

The deoxidant contains at least one of the substances listed below.

<Deoxidant>

2-ethylhexyl glycidyl ether, phenyl glycidyl ether, epoxidized cyclohexyl carbinol, di(alkylphenyl)carbodiimides, and β-pinene.

(3) Basic Operation (3-1) Cold-Heat Operation

In the cold-heat operation, the four-way switching valve 12 configures a refrigerant path indicated by the solid line in FIG. 1. The compressor 11 discharges the high-pressure gas refrigerant in the direction indicated by the arrow in FIG. 1. After passing through the four-way switching valve 12, the high-pressure gas refrigerant reaches the heat source unit heat exchanger 13. The heat source unit heat exchanger 13 functions as a condenser, and converts the high-pressure gas refrigerant into a high-pressure liquid refrigerant. The high-pressure liquid refrigerant is decompressed in the heat source unit expansion valve 15, the liquid refrigerant pipe 31, and the utilization unit expansion valve 21 to become a gas-liquid two-phase refrigerant, which then reaches the utilization unit heat exchanger 22. The utilization unit heat exchanger 22 functions as an evaporator and absorbs heat from the ambient air in a process of converting the gas-liquid two-phase refrigerant into a low-pressure gas refrigerant, thereby cooling the ambient air. The low-pressure gas refrigerant passes through the gas refrigerant pipe 32 and then through the four-way switching valve 12, and is then drawn into the compressor 11 via the accumulator 16.

(3-2) Hot-Heat Operation

In the hot-heat operation, the four-way switching valve 12 configures a refrigerant path indicated by the dashed line in FIG. 1. The compressor 11 discharges the high-pressure gas refrigerant in the direction indicated by the arrow in FIG. 1. After passing through the four-way switching valve 12 and then through the gas refrigerant pipe 32, the high-pressure gas refrigerant reaches the utilization unit heat exchanger 22. The utilization unit heat exchanger 22 functions as a condenser, and dissipates heat in a process of converting the high-pressure gas refrigerant into a high-pressure liquid refrigerant, thereby warming the ambient air. The high-pressure liquid refrigerant is decompressed in the utilization unit expansion valve 21, the liquid refrigerant pipe 31, and the heat source unit expansion valve 15 to become a gas-liquid two-phase refrigerant, which then reaches the heat source unit heat exchanger 13. The heat source unit heat exchanger 13 functions as an evaporator, and converts the gas-liquid two-phase refrigerant into a low-pressure gas refrigerant. Thereafter, the low-pressure gas refrigerant passes through the four-way switching valve 12 and is then drawn into the compressor 11 via the accumulator 16.

(4) Installation Procedure

When the refrigeration apparatus 100 is installed, the heat source unit 10 is installed outdoors, while the utilization units 20A and 20B are installed indoors. In this installation procedure, the heat source unit 10 includes a liquid refrigerant sealed therein in advance in an amount required by the entire refrigeration apparatus 100. Then, the refrigerant communication piping 30 is installed for connecting the heat source unit 10 to each of the utilization units 20A and 20B, thereby completing the refrigerant circuit of the refrigeration apparatus 100. Finally, the refrigerant enclosed in the heat source unit 10 is released to the refrigerant circuit, and then flows toward the utilization units 20A and 20B. At this time, when the disproportionation inhibitor 40 is applied to the inner surface of the liquid refrigerant pipe 31 or the gas refrigerant pipe 32, the refrigerant comes into contact with the disproportionation inhibitor 40. Therefore, the disproportionation reaction is less likely to occur in the refrigerant passing through the liquid refrigerant pipe 31 or the gas refrigerant pipe 32. Then, the refrigerant that has reached the utilization unit liquid passage port 27 and the utilization unit gas passage port 28 penetrates into each portion of the utilization unit 20A. At this time, when the disproportionation inhibitor 40 is applied to the inner surfaces of the utilization unit internal pipelines 29a to 29c, the refrigerant comes into contact with the disproportionation inhibitor 40. Therefore, the disproportionation reaction is less likely to occur in the refrigerant passing through the utilization unit internal pipelines 29a to 29c.

(5) Features (5-1)

The disproportionation inhibitor 40 is applied to inner surfaces of at least a part of the liquid refrigerant pipe 31, the gas refrigerant pipe 32, and the utilization unit internal pipelines 29a to 29c. Therefore, the refrigerant circulating in the refrigerant circuit comes into contact with the disproportionation inhibitor 40, so that the disproportionation reaction of the refrigerant is less likely to occur.

(5-2)

The disproportionation inhibitor 40 may be a polymerization inhibitor that reduces polymerization of the refrigerant. With this configuration, the disproportionation inhibitor 40 reduces the polymerization of the refrigerant. Thus, the degradation in the performance of the refrigerant circuit due to products of polymerization can be reduced.

(5-3)

The present application has shown various findings regarding the composition of the disproportionation inhibitor 40. That is, the disproportionation inhibitor 40 may include at least one of a stabilizer, an antioxidant, or the deoxidant. The stabilizer may contain at least one of an oxidation resistance enhancer, a heat resistance improver, and a metal deactivator. In addition, possible compositions of each of the oxidation resistance enhancer, the heat resistance improver, the metal deactivator, the antioxidant, and the deoxidant are described in the paragraph (2-4) herein. According to these findings, the specific possible compositions of the disproportionation inhibitor 40 are presented, thus enabling the manufacture and preparation thereof.

(6) Modified Examples (6-1) Configuration

In the above embodiment, the refrigerant used in the refrigeration apparatus 100 contains the compound represented by the molecular formula that has one or more carbon-carbon unsaturated bonds. Instead of this, specifically, the refrigerant may be a mixed refrigerant that contains HFO and HFC as main components. Further, refrigerant oil used in the refrigeration apparatus 100 may be a refrigerant oil that contains an alkyl aromatic hydrocarbon and an oxygen-containing hydrocarbon as main components.

HFO is hydrofluoroolefin. HFO is a compound represented by the molecular formula having one or more carbon-carbon unsaturated bonds. Examples of HFO include 1,1,2-trifluoroethylene (HFO-1123), and 2,3,3,3-tetrafluoropropene (HFO-1234yf). HFO is easily decomposed by OH radicals in the atmosphere, and thus has a low global warming potential.

HFC is hydrofluorocarbon. Examples of HFC include R134a represented by a molecular formula $C_2H_2F_4$, R32 represented by a molecular formula $CH_2F_2$, and mixed refrigerants R410A and R407c. HFC does not contain chlorine and thus is less effective in destroying an ozone layer than chlorofluorocarbon (CFC) and hydrochlorofluorocarbon (HCFC).

The alkyl aromatic hydrocarbon is a compound formed by bonding an alkyl group to an aromatic hydrocarbon, such as benzene or naphthalene. The alkyl aromatic hydrocarbon is, for example, an alkylbenzene, such as toluene and ethylbenzene.

The oxygen-containing hydrocarbon includes an ester compound, an ether compound, or a mixture of an ester compound and an ether compound. Examples of the oxygen-containing hydrocarbons include polyvinyl ethers and polyol esters.

The refrigeration apparatus shows the following tendencies regarding the HFO refrigerant ratio, which is a mixing ratio of HFO in a mixed refrigerant (in terms of weight ratio; the same shall apply hereinafter); the HFC refrigerant ratio, which is a mixing ratio of HFC in a mixed refrigerant; an alkyl aromatic oil ratio, which is the mixing ratio of the alkyl aromatic hydrocarbon in the refrigerant oil; and the oxygen-containing oil ratio, which is the mixing ratio of the oxygen-containing hydrocarbon in the refrigerant oil.

Specifically, in the case of using a mixed refrigerant in which the HFO refrigerant ratio is larger than the HFC refrigerant ratio, a refrigerant oil in which the alkyl aromatic oil ratio is larger than the oxygen-containing oil ratio is used. Conversely, in the case of using a mixed refrigerant in which the HFO refrigerant ratio is smaller than the HFC refrigerant ratio, a refrigerant oil in which the alkyl aromatic oil ratio is smaller than the oxygen-containing oil ratio is used. For example, when the HFO refrigerant ratio is 70% and the HFC refrigerant ratio is 30%, the alkyl aromatic oil ratio is 80% and the oxygen-containing oil ratio is 20%. Note that the HFO refrigerant ratio is preferably equal to the alkyl aromatic oil ratio, and the HFC refrigerant ratio is preferably equal to the oxygen-containing oil ratio. Furthermore, preferably, the HFO refrigerant ratio is 40 to 60%, the HFC refrigerant ratio is 60 to 40%, the alkyl aromatic oil ratio is 40 to 60%, and the oxygen-containing oil ratio is 60 to 40%. For example, when the HFO refrigerant ratio is 40% and the HFC refrigerant ratio is 60%, preferably, the alkyl aromatic oil ratio is 40% and the oxygen-containing oil ratio is 60%.

This refrigeration apparatus uses a mixed refrigerant of HFO and HFC as a refrigerant having a low global warming potential. HFO, such as HFO1123, has a carbon-carbon unsaturated bond, and thus can undergo a polymerization reaction in a high-temperature atmosphere, such as the interior space of a compressor. When R32 is used as the HFC, an ether compound and an ester compound are preferably used as the refrigerant oil that has good compatibility with the refrigerant. However, the ether compounds and ester compounds function as initiators of the polymerization reaction of HFO having a carbon-carbon unsaturated bond. A polymer produced by the polymerization reaction of HFO adheres to pipes or the like of the refrigeration apparatus, causing clogging of a refrigerant flow passage.

However, by adding a predetermined amount of an alkyl aromatic hydrocarbon, which is less likely to function as an initiator of the polymerization reaction, as a main component of the refrigerant oil, the polymerization reaction of HFO can be reduced while securing the compatibility between HFC and the refrigerant oil. Thus, it is preferable that as the HFO refrigerant ratio, which is the mixing ratio of HFO in the mixed refrigerant, becomes higher, the alkyl aromatic oil ratio, which is the mixing ratio of alkyl aromatic hydrocarbons in the refrigerant oil, is high.

(6-2) Features
(6-2-1) First Aspect of Modified Example

The refrigeration apparatus 100 according to a first aspect of a modified example uses: a mixed refrigerant that contains HFO and HFC as main components; and a refrigerant oil that contains an alkyl aromatic hydrocarbon and an oxygen-containing hydrocarbon as main components. The oxygen-containing hydrocarbon contains at least one of an ether or an ester. In the mixed refrigerant, the weight mixing ratio of HFO is defined as a first refrigerant ratio, and the weight mixing ratio of HFC is a second refrigerant ratio. In the refrigerant oil, the mixing ratio of the alkyl aromatic hydrocarbon is a first oil ratio, and the mixing ratio of the oxygen-containing hydrocarbon is a second oil ratio. When the first refrigerant ratio is greater than the second refrigerant ratio, the first oil ratio is greater than the second oil ratio. When the first refrigerant ratio is smaller than the second refrigerant ratio, the first oil ratio is smaller than the second oil ratio.

With this configuration, the refrigerant oil contains the alkyl aromatic hydrocarbon. HFO refrigerants have carbon-carbon unsaturated bonds, and some of the HFO refrigerants, such as HFO1123, are easily polymerized at high temperatures. Meanwhile, the ether compound and the ester compound are suitable for use as the refrigerant oil having good compatibility with the HFC refrigerant, such as R32. However, ether compounds and ester compounds tend to function as initiators for the polymerization reaction of the HFO refrigerant having a carbon-carbon unsaturated bond. The polymer produced by the polymerization reaction adheres to pipes or the like of the refrigeration apparatus, causing clogging of the refrigerant flow passage. However, by adding a predetermined amount of the alkyl aromatic hydrocarbon as a main component of the refrigerant oil, the polymerization reaction of the HFO refrigerant can be reduced while ensuring the compatibility between the HFC refrigerant and the refrigerant oil. Therefore, according to the first aspect, the refrigeration apparatus can be provided which has high safety while reducing clogging of the polymer generated by the polymerization reaction of the refrigerant.

(6-2-2) Second Aspect of Modified Example

A refrigeration apparatus 100 according to a second aspect of a modified example is the refrigeration apparatus according to the first aspect of the modified example wherein HFO1123 may be used as HFO, and R32 may be used as HFC.

With this configuration, by adding a predetermined amount of the alkyl aromatic hydrocarbon as a main component of the refrigerant oil, the polymerization reaction of the HFO1123, which is a kind of the HFO refrigerant, can be reduced while ensuring the compatibility with R32, which is a kind of the HFC refrigerant.

(6-2-3) Third Aspect of Modified Example

A refrigeration apparatus 100 according to a third aspect of a modified example is the refrigeration apparatus according to the first aspect or the second aspect of the modified example wherein the first refrigerant ratio is equal to the first oil ratio, and the second refrigerant ratio is equal to the second oil ratio.

With this configuration, by adding a predetermined amount of the alkyl aromatic hydrocarbon as a main component of the refrigerant oil, the polymerization reaction of the HFO refrigerant can be reduced while ensuring the compatibility with the HFC refrigerant.

(6-2-4) Fourth Aspect of Modified Example

A refrigeration apparatus 100 according to a fourth aspect of a modified example is the refrigeration apparatus according to any one of the first to third aspects of the modified example wherein the first refrigerant ratio is 40% to 60%, the second refrigerant ratio is 60% to 40%, the first oil ratio is 40% to 60%, and the second oil ratio is 60% to 40%.

With this configuration, the polymerization reaction of the HFO refrigerant can be more reduced while ensuring the compatibility between the HFC refrigerant and the refrigerant oil.

REFERENCE SIGNS LIST

10 Heat source unit
19*a* to *g* Heat source unit internal pipeline
20A, 20B Utilization unit
29*a* to *c* Utilization unit internal pipeline
30 Refrigerant communication pipe
31 Liquid refrigerant pipe
32 Gas refrigerant pipe
40 Disproportionation inhibitor
100 Refrigerator

CITATION LIST

Patent Literature

Japanese Unexamined Patent Application Publication No. 2015-007257

The invention claimed is:
1. A refrigeration apparatus comprising:
a refrigerant pipe;

a heat exchanger connected to the refrigerant pipe;
a compressor connected to the refrigerant pipe;
a refrigerant containing HFO and HFC as main components, the refrigerant passing through the refrigerant pipe,
a refrigerant oil containing an alkyl aromatic hydrocarbon and an oxygen-containing hydrocarbon as main components;
the oxygen-containing hydrocarbon including at least one of an ester and an ether,
a first refrigerant ratio being a mixing ratio by weight of HFO in the refrigerant,
a second refrigerant ratio being a mixing ratio by weight of HFC in the refrigerant,
a first oil ratio being a mixing ratio of the alkyl aromatic hydrocarbon in the refrigerant oil,
a second oil ratio being a mixing ratio of the oxygen-containing hydrocarbon in the refrigerant oil,
wherein the first oil ratio is larger than the second oil ratio in a case where the first refrigerant ratio is larger than the second refrigerant ratio, whereas the first oil ratio is smaller than the second ratio in a case where the first refrigerant ratio is smaller than the second refrigerant ratio.

2. The refrigeration apparatus according to claim 1, wherein the HFO is HFO1123, and
wherein the HFC is R32.

3. The refrigeration apparatus according to claim 1, wherein the first refrigerant ratio is equal to the first oil ratio, and
wherein the second refrigerant ratio is equal to the second oil ratio.

4. The refrigeration apparatus according to claim 1, wherein the first refrigerant ratio is 40 to 60%,
wherein the second refrigerant ratio is 60 to 40%,
wherein the first oil ratio is 40 to 60%, and
wherein the second ratio is 60 to 40%.

5. The refrigeration apparatus according to claim 1, further comprising
a polymerization inhibitor for reducing polymerization of the refrigerant, the polymerization inhibitor provided in the refrigerant pipe.

6. The refrigeration apparatus according to claim 1, further comprising
at least one of an oxidation resistance enhancer, a heat resistance improver, and a metal deactivator, provided in the refrigerant pipe,
wherein the oxidation resistance enhancer and the heat resistance improver contains at least one of
N,N'-diphenyl-phenylenediamine,
p-octyldiphenylamine,
p,p'-dioctyldiphenylamine,
N-phenyl-1-naphthylamine,
N-phenyl-2-naphthylamine,
N-(p-dodecyl)phenyl-2-naphthylamine,
di-1-naphthylamine,
di-2-naphthylamine,
N-alkyl phenothiazine,
6-(t-butyl)phenol,
2,6-di-(t-butyl)phenol,
4-methyl-2,6-di-(t-butyl)phenol, and
4,4'-methylenebis(2,6-di-t-butylphenol), and
the metal deactivator contains at least one of
imidazole,
benzimidazole,
2-mercaptobenzthiazole,
2,5-dimercaptothiadiazole,
salicylidene-propylene diamine,
pyrazole,
benzotriazole,
tolutriazole,
2-methylbenzimidazole,
3,5-dimethylpyrazole,
methylenebis-benzotriazole,
an organic acid or an ester thereof,
a primary, secondary or tertiary aliphatic amine,
an amine salt of an organic acid or inorganic acid,
a heterocyclic nitrogen-containing compound, and
an amine salt of an alkyl acid phosphate or a derivative thereof.

7. The refrigeration apparatus according to claim 1, further comprising
an antioxidant provided in the refrigerant pipe,
wherein the antioxidant contains at least one of
zinc dithiophosphate,
an organosulfur compound,
2,6-di-tert-butyl-4-methylphenol,
2,6-di-tert-butyl-4-ethylphenol,
2,2'-methylenebis(4-methyl-6-tert-butylphenol),
phenyl-α-naphthylamine,
N,N'-di-phenyl-p-phenylenediamine,
and N,N'-disalicilidene-1,2-diaminopropane.

8. The refrigeration apparatus according to claim 1, further comprising
a deoxidant provided in the refrigerant pipe,
wherein the deoxidant contains at least one of
2-ethylhexyl glycidyl ether,
glycidyl phenyl ether,
epoxidized cyclohexyl carbinol,
di(alkylphenyl)carbodiimide, and
β-pinene.

9. A refrigeration apparatus comprising:
a refrigerant pipe;
a heat exchanger connected to the refrigerant pipe;
a compressor connected to the refrigerant pipe;
a refrigerant containing HFO and HFC as main components, the refrigerant passing through the refrigerant pipe,
a refrigerant oil containing an alkyl aromatic hydrocarbon and an oxygen-containing hydrocarbon as main components;
the oxygen-containing hydrocarbon including at least one of an ester and an ether,
a first refrigerant ratio being a mixing ratio by weight of HFO in the refrigerant,
a second refrigerant ratio being a mixing ratio by weight of HFC in the refrigerant,
a first oil ratio being a mixing ratio of the alkyl aromatic hydrocarbon in the refrigerant oil,
a second oil ratio being a mixing ratio of the oxygen-containing hydrocarbon in the refrigerant oil,
wherein the first oil ratio is larger than the second oil ratio, and the first refrigerant ratio is larger than the second refrigerant ratio.

10. A refrigeration apparatus comprising:
a refrigerant pipe;
a heat exchanger connected to the refrigerant pipe;
a compressor connected to the refrigerant pipe;
a refrigerant containing HFO and HFC as main components, the refrigerant passing through the refrigerant pipe,
a refrigerant oil containing an alkyl aromatic hydrocarbon and an oxygen-containing hydrocarbon as main components;

the oxygen-containing hydrocarbon including at least one of an ester and an ether,
a first refrigerant ratio being a mixing ratio by weight of HFO in the refrigerant,
a second refrigerant ratio being a mixing ratio by weight of HFC in the refrigerant,
a first oil ratio being a mixing ratio of the alkyl aromatic hydrocarbon in the refrigerant oil,
a second oil ratio being a mixing ratio of the oxygen-containing hydrocarbon in the refrigerant oil,
wherein the first oil ratio is smaller than the second ratio, and the first refrigerant ratio is smaller than the second refrigerant ratio.

* * * * *